United States Patent [19]
Guida et al.

[11] Patent Number: 4,793,323
[45] Date of Patent: Dec. 27, 1988

[54] SINGLE-USE SELF-HEATING CONTAINER FOR LIQUIDS AND/OR SOLIDS

[75] Inventors: Francesco Guida; Giacomino Randazzo; Vittorio Guida, all of Naples, Italy

[73] Assignee: Blusei S.P.A., Naples, Italy

[21] Appl. No.: 73,242

[22] Filed: Jul. 14, 1987

[30] Foreign Application Priority Data

Jul. 16, 1986 [IT]  Italy .............................. 40427 A/86
Jul. 8, 1987 [IT]  Italy .............................. 48148 A/87

[51] Int. Cl.$^4$ .............................. F24J 1/00; F24J 3/00
[52] U.S. Cl. ...................................... 126/263; 122/21; 206/219; 206/222
[58] Field of Search .......................... 122/21; 126/263; 206/219, 220, 222

[56] References Cited

U.S. PATENT DOCUMENTS

| | | |
|---|---|---|
| 2,300,793 | 11/1942 | Martin . |
| 3,970,068 | 7/1976 | Sato ...................... 126/263 |
| 4,002,235 | 1/1977 | Donnelly ................ 126/263 X |
| 4,528,218 | 7/1985 | Maione .................. 126/263 X |
| 4,559,921 | 12/1985 | Benmussa .............. 126/263 |
| 4,640,264 | 2/1987 | Yamaguchi et al. ..... 126/263 |

FOREIGN PATENT DOCUMENTS

| | | |
|---|---|---|
| 204693 | 3/1971 | Fed. Rep. of Germany . |
| 2231342 | 12/1974 | France . |
| 942063 | 7/1971 | Italy . |
| 50330-A/80 | 12/1980 | Italy . |
| 49636-A/82 | 11/1982 | Italy . |
| 2089970 | 10/1982 | United Kingdom . |

Primary Examiner—Edward G. Favors
Attorney, Agent, or Firm—Beveridge, DeGrandi & Weilacher

[57] ABSTRACT

A single-use self-heating container has an insulating external envelope. A plastic vessel is within and attached to the envelope. A membrane separates the vessel into an upper compartment which contains one reagent and a lower compartment which contains another reagent. A membrane-breaking member is in the lower compartment. A metallic container with a thermally welded peelable cover is fastened to an upper portion of the plastic vessel. To prevent abrupt temperature changes, the upper compartment of the plastic vessel may contain a temperature control substance which undergoes a change in state between 90° and 100° C.

21 Claims, 3 Drawing Sheets

SINGLE-USE SELF-HEATING CONTAINER FOR LIQUIDS AND/OR SOLIDS

DISCLOSURE OF THE INVENTION

The present invention relates to a single-use, self-heating container for liquids and/or solids, preferably for foodstuffs.

More particularly, the present invention relates to a container of the kind specified above, in which an exothermic reaction is exploited occurring among a number of reagents, and preferably between two reagents, one of which reagents is solid whereas the other one is liquid, said reaction developing rapidly when the liquids and/or solids in said container are to be heated.

It is well known from the technical literature that the rate and the efficiency of heat transfer depend on the conductivity and the heat capacity of materials employed, as well as by the adiabatic features of the system, on the exchange geometry and on the way heat is produced. Technical experiments put into evidence that substances generating alkaline or acid media and possibly noxious gases in the presence of water cannot be employed to realize self-heating containers for foodstuffs. Metal oxides only can be employed in the presence of equimolar amounts of acid.

An additional problem to be solved is that of assuring the presence of a suitable reaction mass, which, with its heat capacity and being arranged completely around the container to be heated, allows a rapid, uniform and efficient heat transfer to occur.

Various solutions have been suggested more or less recently, but no one of such suggestions solved the problems mentioned above. For instance, the Italian Patent Application No. 50330-A/80 suggests the employment of calcium oxide with a reaction mass of just about 10 ml. Calcium oxide alone is also employed in the solutions to such problems according to the Italian Patent No. 1.002.244, as well as according to the European Patent No. 82870077.3 and the French Patent No. 2.231.342.

Iron and alluminium trichlorides are employed on the contrary in the Italian Patent No. 942.063, whereas the German Patent Nos. 2.730,243, 2.606.806 and 2.155.405 teach the use of chemical reagents that take fire with air oxygen.

No prior document discloses the control of the exothermic reaction.

In a heating system in which water is employed as a reactant, the temperature peak is not to be much higher than 100° C. so that steam is not generated and consequently the possible pressures within the container are avoided, if the same is insulated from the outside.

Such problems are not solved in the U.S. Pat. No. 3.653.372, as well as in the European Patent No. 81902310, in the Italian Patent Applications Nos. 50330-A/80 and 49636-A/82, and in the Italian Patent No. 942063.

A too slow heat production causes a remarkable loss of calories. Moreover, such problem cannot be solved realizing fully adiabatic systems, as such systems are too expensive.

In order to overcome the drawbacks mentioned above, the main object of the present invention is that of providing a self-heating container to be used once, in which a rapid, efficient and controlled exothermic reaction occurs, which container is realized according to such a geometrical shape as to allow a rapid and uniform heating to be obtained.

It is an additional object of the present invention that of realizing a container of the type mentioned above that can assure possibly a sterile conditioning of the solid and/or liquid substances contained in the same and, anyway, in any case an absolute and safe separation of such substances from the chemical reactants, in any case non-toxic.

It is a further object of the present invention that of suggesting a reaction starting device which is insulated from the outside and, as a controlled reaction is employed, allows the absolute certainty of conservation in time of the reactants to be obtained, prevents obstructions and partial tearing of the breakable separation membrane of the two reagents from occurring and allows a rapid mixing of the liquid and the solid reagent to occur.

Moreover, the Applicant suggests a self-heating container provided with a valve and/or safety regulation device which allows said container to be employed at any environment temperature or possibly also in conditions in which the container itself becomes exposed to heat sources, preventing the potential temperature jump from causing dangerous overpressures at the furnace and/or on the drink.

Accordingly, it is a specific object of the present invention a self-heating container for liquids and/or solids, to be used once, said container comprising an outer insulating envelope, a plastic material vessel provided inside said external envelope and integrally fastened to the same, said vessel being divided into two compartments, respectively an upper and a lower compartment which are separated by a membrane; a metallic container for containing solid and/or liquid substances which is fastened superiorly by keying with thermic welding to said plastic material vessel, and is closed at the top with a thermally welded, peelable diaphragm; a covering member which seals and protect at the upper part said self-heating container; and a breaking member integral or not with the same arranged inside the lower compartment of the plastic material vessel, said breaking member being able to break said membrane when acted upon by outer starting means; a liquid reagent being contained within the lower compartment of said vessel, whereas a solid reagent is contained within the upper compartment of the same, or viceversa.

Preferably according to the present invention said upper compartment of the vessel, or the compartment wherein the reaction occurs, is completely insulated and of high tightness, and is so realized as to form an integral piece with said metallic container.

A safety device against overpressures can be provided within said upper compartment, such device being in particular made up of a blade or a lamina of thickness lower than that of the plastic material vessel wall, said blade being arranged at the point corresponding to a hole obtained in the wall of the vessel itself.

A heat transfer jacket is preferably realized between the outer envelope and the vessel, said jacket having a volume that corresponds to about the volume of the upper compartment of the vessel.

A reduction of the transverse cross section size is provided on said outer envelope and said vessel at the point corresponding to the membrane dividing the upper from the lower compartment.

Said metallic container is realized preferably with an upper rim or edge whose shape allows said peelable diaphragm to be thermally welded to the same and allows the same edge to be integrally connected to said vessel.

The movable breaking member arranged within said lower compartment can be provided with a device bearing at least one arm turned upwards, in the direction of said membrane, which arm is provided at its ends with projecting members that avoid obstructions during the defluxion of one of the reagents.

Alternatively, he movable breaking member can be constituted by one or more little shaped tubes, having the above said functions.

Finally, according to the present invention said breaking member can also be made up of at least one stem or vertical member which can be obtained direct by extrusion on the concave bottom of the plastic material vessel.

The outer envelope will be preferably open at the bottom, said plastic material vessel being provided with an elastic concave bottom which, as a result of an external action, is bent inwards pushing the breaking member towards the membrane that separates the two compartments of the vessel.

The self-heating container according to the present invention can also be provided in addition with an employment indicator made up of a heat sensitive material of irreversible type such as tapes, adhesives, paints and so on.

Preferably, the solid reactant provided in the upper compartment of said plastic material vessel is anhydrous calcium chloride of suitable grain sizes, to which reactant some acids and bases may possibly be added in equimolar amounts, whereas the liquid reactant consists of tap water.

Said solid reactant in addition can also consist according to present invention of calcium oxide, magnesium oxide, citric acid, oxalic acid, acetic acid, anhydrous magnesium or sodium sulfates. The reactants may have granulometry 1-8.

Heat exchange preferably occurs in about 40 seconds.

A shaped peelable container can be provided above said metallic container, said container that can be peeled off containing the solids and/or liquids to be added to the substance contained within the metallic container before heating.

In order to allow the container according to the present invention to be employed at any temperature with no production of dangerous overpressures within the reaction compartment and/or on the beverage due to the potential temperature jump, a substance can be added in said upper or reaction compartment of the vessel, which substance changes state within a temperature range (90°-100° C.) that is not to be exceeded in order to avoid the problems mentioned above. This is realized with or without said safety valve.

More particularly, non toxic, low heat capacity substances will be employed, which do not alter the properties of the reactants and whose specific weights are lower than the specific weight of water, which substances in addition are immiscible with water.

Preferably, hydrophobic solids of specific weight lower than 1 g/cc will be employed.

Substances that can be employed to that aim are benzoic acid (melting point 100° C.; melting heat 34.0 cal/g), glutaric acid (m.p. 99° C.; m.h. 37.0 cal/g), 90% stilbene (m.p. 99° C.; m.h. 40 cal/g), and paraffin mixtures and/or natural waxes (m.p. 90°; m.h. 56 cal/g).

The excess heat produced is absorbed as melting heat, depending on the kind of compound employed. Employing the substances mentioned above, the result is obtained of not changing the efficiency of the heat capacity of the reaction mixture that gives off heat, and in addition of avoiding evaporation losses due to the arrangement above the mixture, to the heat insulating action and to the conveying of all heat developed to the exchange with the beverage through the container.

Once the heat exchange has been performed, the temperature decrease causes the controlling substance to solidify again, which substance then will give off a part of heat absorbed which thus is given back to the system.

The main advantages stemming from the employment of such controlling substance can be summarized as follows:

the safety device intervenes just when the heat generator reaches the melting temperature of controlling substances;

the heat exchange time and efficiency are not affected;

in case the safety device does not intervene, the heating conditions keep unchanged.

Controlling substances are inert and do not influence the exothermic reaction.

The present invention will be disclosed in the following just for illustrative and not for limitation purposes according to some preferred embodiments of the same which are illustrated in the Figures of the enclosed drawings wherein.

Figure 1:
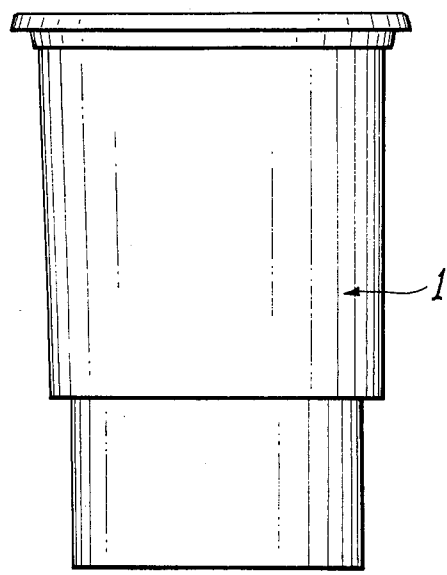
FIG. 1 is a side view of the self-heating container according to the present invention.
Figure 3:
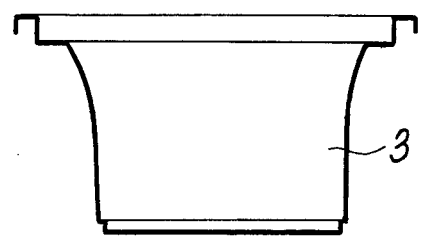
FIG. 3 is a section view of the self-heating container shown in FIG. 1.
Figure 4:
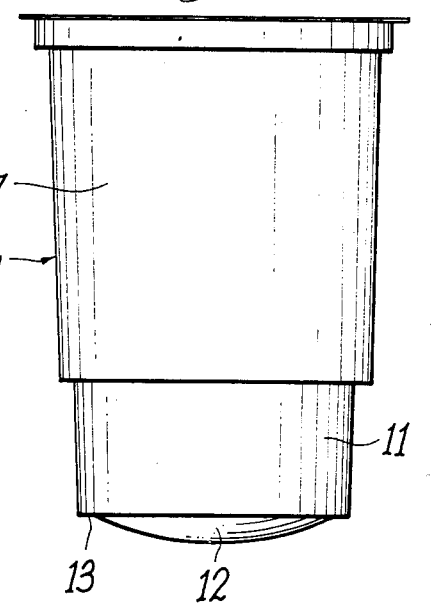
FIG. 4 is a side view of the plastic material vessel of the container shown in FIG. 1.
Figure 2:
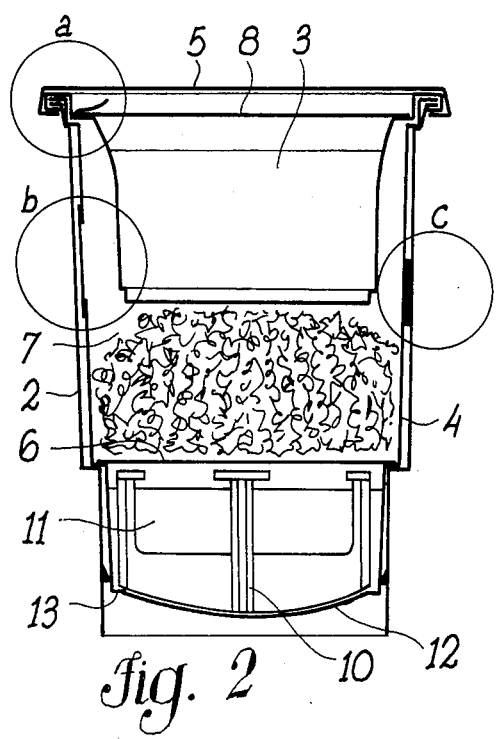
FIG. 2 is a cross-section view of the container shown in FIG. 1.
Figure 5:
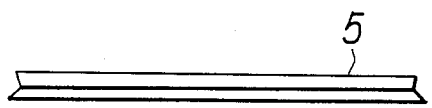
FIG. 5 is a side view of the closing member of the container according to the present invention.
Figure 6:
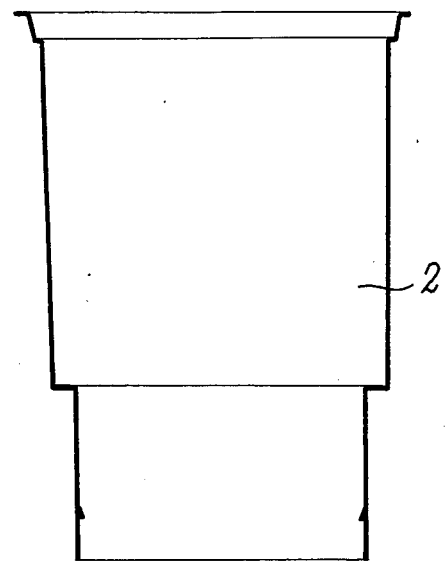
FIG. 6 is a section view of the outer envelope of the container according to the present invention.

With reference now to all Figures of the enclosed drawings it can be observed that the self-heating container 1 according to the present invention (FIG. 1) is made up of an insulating outer envelope 2, of a metallic container 3 which is preferably of aluminium, of a plastic material vessel 4, and of a cover member 5.

Within said plastic material vessel 4 and starting from the bottom, a liquid and a solid reactant, or viceversa, are enclosed, which are separated by a thermally enameled aluminium rolled section 6 of 0.01–0.09 mm thickness which is thermally welded to the toroidal surface of the reaction compartment 7.

Figure 12:
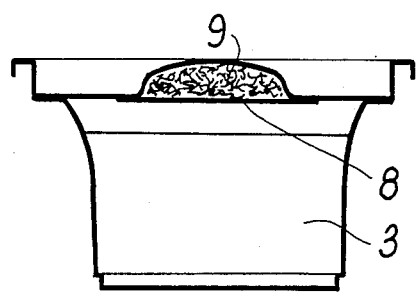
FIG. 12 shows the metallic container of FIG. 3 with a different closing system.

The metallic container 3 previously enameled with thermally weldable enamels on both sides, which is obtained by drawing, contains liquid and/or solid foodstuffs which are in turn tightly closed with a peelable member 8 made up of a metal and/or of a plastic material composite, of suitable thickness (0.03–0.5 mm). Alternatively, the member 8 that can be peeled off can be so shaped (see FIG. 12) as to contain within a pocket the solid and/or liquid foodstuffs, which are instant soluble, sealed by means of a diaphragm 9 made up of aluminium (0.012–0.020 mm) or of any other breakable material fastened by thermal welding. In that case, mixing with the liquid contained in said container 3 begins before heating due to the going out of the liquid and/or solid substance contained within said pocket as a result of a pressure exerted on said peelable member 8.

Figure 8:
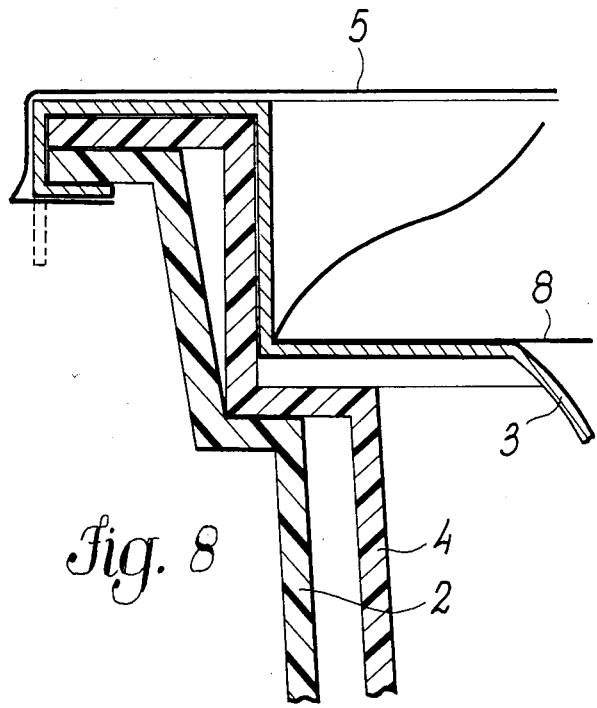
FIG. 8 shows the detail pointed out by "a" in FIG. 2.

The container 3 is keyed or shrunk-on within the first plastic material vessel 4 and thermally welded to the toroidal member (see more particularly FIG. 8).

Figure 7A:
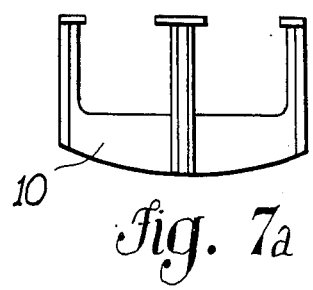
FIGS. 7a and 7b show respectively a side view and a plan view of the breaking member of the container according to the present invention.
Figure 7B:
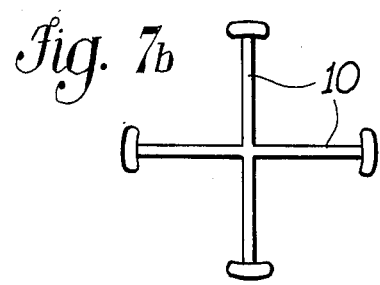

A breaking member 10 made up of a plastic material or of any other suitable material is arranged at the base of the plastic vessel 4 (see FIGS. 7a–7b), said member consisting of one or more stems ending in a projection part.

Figure 11:
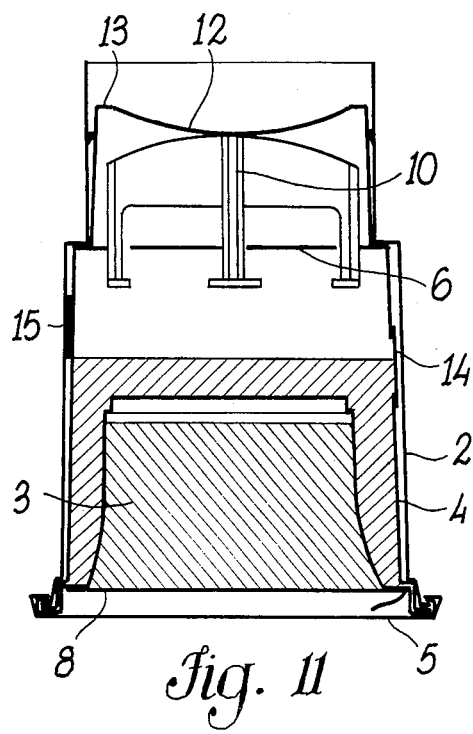
FIG. 11 shows the container according to the present invention in the upside-down position, with the breaking member in the active position.

Said braking member 10, owing to its particular shape, prevents the rolled section 6 from becoming obstructed and partially torn; moreover, the liquid reactant contained within the compartment 11 will rapidly flow by the action of gravity onto the solid reactant inside the reaction compartment 7, the container 1 being in the upside-down position (see FIG. 11). The breaking member 10 will exert its function owing to the elasticity of the concave bottom 12 of the plastic vessel 4 which, by external manually exerted pressure will bend inwards so allowing the breaking member 10 to penetrate into the rolled section 6 by a 5–20 mm depth so breaking the rolled section itself. That is made possible by the presence of the toroidal ridge 13 of about 3 mm acting as a hinging member for the concave bottom 12 so as to give the system both elasticity and flexibility.

Figure 9:
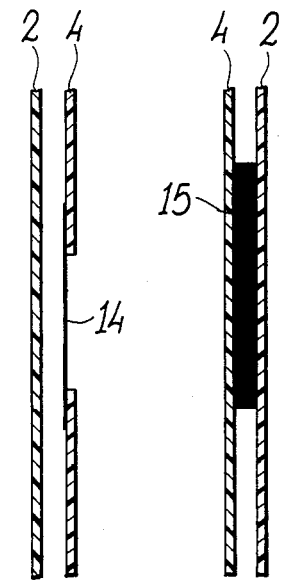
FIG. 9 shows the detail pointed out by "b" in FIG. 2.

For a safe operation of the container 1, the safety valve 14 (FIG. 9) is provided against overpressures that may arise as a result of lack of substances which should absorb heat produced or of any possible incorrect proportion of the reactants, or as a result of improper use.

Such safety valve is realized by obstructing through the lamina 14 that forms the proper valve a hole obtained in the vessel 4.

The lamina 14 breaks at a determined pressure depending on its thickness and/or the hole diameter, and the discharge occurs between the envelope 2 and the vessel 4.

Figure 10:
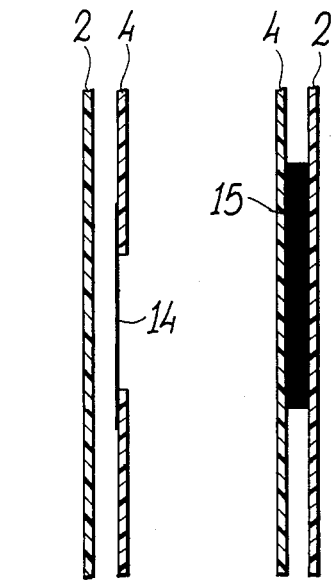
FIG. 10 shows the detail pointed out by "c" in FIG. 2.

Moreover, an employment indicator 15 is provided between said envelope 2 and the vessel 4 (FIG. 10) said indicator being made up of an irreversible heat sensitive material which serves the purpose of warning the consumer that the correct temperature for eating or drinking the foodstuffs has been reached. Said indicator can be calibrated at a temperature of 50° C. and it also performs the function of assuring the thermal soundness of the container 1 according to the invention.

FIG. 8 shows that the envelope 2 which performs a heat insulating function forms an integral piece with the vessel 4 due to the rolling of the ridge of the metallic container 3.

The envelope 2, the vessel 4 as well as the covering member 5 are preferably made up of polypropylene, as economy, heat resistance at the service temperature, construction simplicity, tightness to external water vapor which alters the nature and the efficiency of at least one of the reactants, low heat capacity and finally constructive flexibility in order to employ containers of various sizes for different purposes, are so obtained with some certainty.

The metallic container 3 for solids and/or liquids is of 1.5–2.5 mm thickness and of such a diameter as to be spaced by 4–12 mm from the wall of the plastic vessel 4; moreover, said container is of 30–70 mm depth.

Such size ratios allow the reaction mixture to surround the metallic container 3 fully, and so they also allow a rapid change of the hot reaction mixture at the exchange interface as well as a rapid, uniform and wide transfer of the heat given off to occur.

A typical realization of the present invention is as follows: outer envelope 2 consisting of polypropylene, of 90 mm height and average diameter about 55 mm; polypropylene reaction compartment 7 (thickness of 0.5 mm, height of 88 mm and average diameter 52.2 mm) provided with a safety valve 14 calibrated at one atmosphere (the valve being obtained with a 10 mm hole on which an aluminum disk of 0.01 mm thickness is thermally welded), said valve being provided with a breaking member 10 consisting of four breaking members; 35 ml of water is filled into the lower compartment 11 together with said breaking member. The reaction compartment 7 is separated from the compartment 11 by means of a rolled section 6 of thermally enameled aluminum of 0.04 mm thickness; 28 g of anhydrous calcium chloride (1–2 mm grain size, complexometric purity above 90%) is placed into said compartment 7; the aluminum container 3, of 0.2 mm thickness, 35 mm height and 42.5 mm diameter, previously enameled and drawn, containing 35 mm of a beverage (coffee) that is sealed with a 0.07 mm diaphragm which can be peeled off, the sealing being obtained through thermal welding, is keyed or shrunk-on in the plastic vessel 4 and then welded to the same; the polypropylene cover 5 closes the top of the container 1, protecting the assumption surface.

Heat production is obtained by turning the container 1 upsidedown and exerting manually a pressure on the concave bottom 12 of the reaction compartment 7 which, pushing the breaking member 10 against the rolled section 6 allows the same to break and hence the mixing of the two reactants to occur. The temperature of the beverage with a starting value of 19° C., after about 40 seconds and through continuous agitation reaches the value of 62° C.

Similar results are obtained employing the following alternative heat producing mixture, by putting the liquid compounds together with the breaking member 10 into the compartment 11 and the solid compounds into the compartment 7: a) anhydrous calcium chloride (25 g), acetic acid (4.8 ml), calcium oxide (2.24 g), water (35 ml); b) anhydrous calcium chloride (25 g), calcium oxide (3.36 g), oxalic acid (7.56 g), water (35 ml).

Figure 13A:
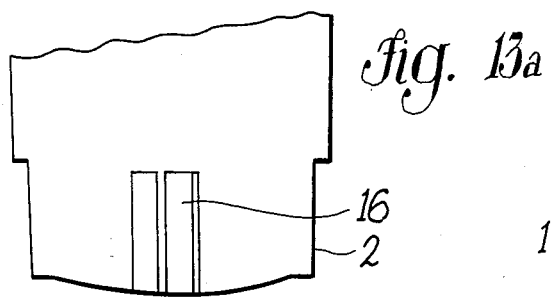
FIGS. 13a and 13b show, respectively, a side view and a plan view of a second embodiment of the breaking member
Figure 13B:
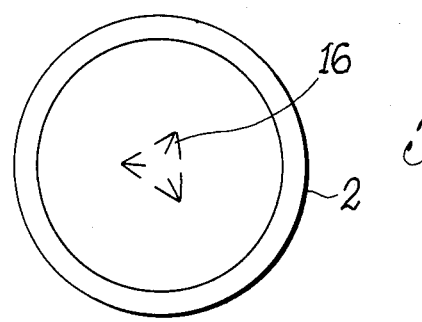

FIGS. 13a and 13b show the compartment 11 in which the breaking member 10 is provided, which member consists in that case of three vertical members 16 obtained by extrusion on the concave bottom 12 of the vessel 4. Such kind of arrangement makes it possible to obtain, on breaking the rolled section 6, both a penetration and a translation action as a result of the shape of the bottom 12.

Figure 14A:
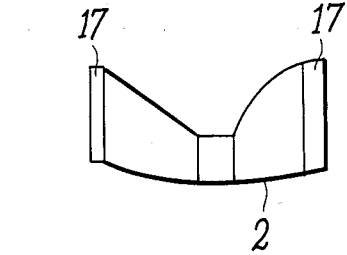
FIGS. 14a and 14b show, respectively, a side view and a plan view of a third embodiment of the breaking member.
Figure 14B:
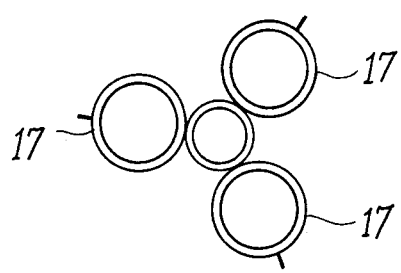

FIGS. 14a and 14b show a third embodiment of the breaking member made up by little shaped tubes 17.

An example is disclosed in the following of a container embodiment of the present invention, in which embodiment the temperature regulating substance is provided.

EXAMPLE 35 ml of water and a breaking member 10 are placed into the compartment 11 of the polypropylene vessel 4. Said compartment 11 has been closed by thermal welding of a rolled section 6 consisting of thermally enameled aluminium. 28 g of anhydrous calcium chloride (grain size 1-2 mm, complexometric purity above 90%) plus 7 g of microcrystalline wax in the form of small flakes (a mixture of medium-high molecular weight saturated hydrocarbons with melting point 90° and of empirical formulas about $C_{20}H_{102}$, and consisting of $C_{33}$-$C_{55}$ saturated hydrocarbons containing 10% isoparaffin; specific weight 0.94 g/cc) were introduced into the upper compartments 7 of a given number of containers 1 prepared according to the present invention.

Only 28 g of anhydrous calcium chloride was put into the compartments 7 of another set of containers 1. A container 3 made up of twice enameled aluminum and containing 35 ml of a beverage was thermally welded and fastened by seaming to all such containers, said beverage being sealed by means of a peelable diaphragm 8 of 0.07 mm thickness.

The starting device was activated by turning the container 1 upside-down and exerting a pressure on the concave bottom 12, and then by circular agitation for 40 seconds.

Maximum and final temperature of the reaction mass after 40 seconds were determined by a needle electronic thermometric probe inserted into the jacket between the aluminum container 3 and the plastic vessel 4.

Finally, the beverage temperature after 40 seconds, i.e. after the time provided for heat exchange, was determined by means of the same needle thermometric probe inserted into said aluminum container 3, by piercing the closing peelable diaphragm 8.

Such determinations were carried out in two typical beginning conditions, i.e. with the container 1 thermostatically set at about 6° C. and at about 43° C.

The first situation simulates the employment of the container 1 in winter, whereas the second situation was designed to simulate the employment of the same under exaggerated summer conditions, i.e. not only under maximum hot weather conditions but also under overheating conditions owing to direct exposure to a heat source or due to improper use.

The temperature values determined were as follows:

5 samples without the controlling substances (waxes), starting from a temperature of 43° C. reached the following maximum values of the reaction mass temperatures (the sampling time is shown in brackets): 112.6° C. (10″)–108.7° C. (8″)–112.8° C. (8″)–113.9° C. (8″) after 40 seconds was, respectively, of 84° C., 85° C., 84° C., 84° C. and 84° C., while the temperature of the beverage after 40 seconds was, respectively of 82.6° C., 83.4° C., 82.2° C., 82.7° C. and 82.6° C.;

5 samples with the controlling substance, starting from a temperature of 43.2° C. reached the following maximum values of the reaction mass temperature: 99.9° C. (8″)–99.3° C. (6″)–101.9° C. (8″)–98.6° C. (8″)–98.8° C. (7″). The reaction mass temperature after 40 seconds was respectively of 80° C., 80° C., 80° C., 80° C. and 80° C., while the temperature of the beverage after 40 seconds was of 78.7° C., 78.5° C., 78.8° C., 79.0° C. and 78.9° C.;

samples without controlling substance starting from 5.8° C. reached the following maximum values of the reaction mass temperature: 71.5° C. (7″)–70.1° C. (7″)–70.2″ C. (7″)–68.7″ C. (9″)–68.2° C. (8″). The temperature of the reaction mas after 40 seconds was respectively of 50° C., 49° C., 50° C., 50° C., while the temperature of the beverage after 40 seconds was of 48.1° C., 48.2° C., 48.9° C., 48.7° C. and 48.2° C.; samples with the controlling substance, starting from 5.8° C. reached the following maximum values of the reaction mass temperature: 62.1° C. (9″)–61.8° C. (9″)–64.5° C. (9″) 65.1° C. (8″)–65.5° C. (9″). The temperature of the reaction mass after 40 seconds was respectively of 49° C., 48° C., 49° C., 49° C. and 49° C. while the temperature of the beverage after 40 seconds was of 47.5° C., 47.5° C., 47.8° C., 47.6° C. and 47.6° C.

The heat production kinetics shows that the maximum value of heat production is obtained in the first 10 reaction seconds during which the controlling substance intervenes causing the maximum reachable temperature to decrease by 3°–15° C., as can be observed from data mentioned above.

The present invention has been disclosed with reference to some preferred embodiments of the same but it is to be understood that modifications and/or changes can be introduced in the same by those who are skilled in the art without departing from the spirit and scope of the invention for which a priority right is claimed.

We claim:

1. A single-use, self-heating container for liquids and/or solids, characterized in that it comprises an outer insulating envelope; a plastic material vessel provided inside said outer envelope and fastened integrally to the same, said vessel being divided into two compartments, respectively an upper and a lower compartment separated by a membrane; a metallic container for containing solid and/or liquid substances, said container being fastened by keying or shrinking-on with thermal welding to the upper part of said plastic material vessel and being closed at the top by a thermally welded diaphragm that can be peeled off; a covering member which seals and protect at the upper part said self-heating container; and a breaking member arranged inside the lower compartment of said plastic material vessel divided into two said compartments, said breaking member being able to break said membrane when acted upon by external starting means; a liquid reactant being contained within the lower compartment of said vessel whereas a solid reactant is contained within the upper compartment of the vessel itself, or viceversa.

2. A self-heating container according to claim 1 characterized in that said upper compartment of the plastic material vessel is fully insulated and of high tightness to the outer environment, as it is so realized as to form an integral piece with said metallic container.

3. A self-heating container according to claim 1, characterized in that said upper compartment is provided with a safety device against overpressures.

4. A self-heating container according to claim 3, characterized in that said safety device is made up of a blade or lamina of thickness lower than the thickness of the plastic material vessel wall, said lamina being arranged at the point corresponding to a hole obtained in the wall itself of said vessel.

5. A self-heating container according to claim 1 characterized in that between the metallic container and the plastic material vessel a heat exchange interspace is realized, said interspace being of such a volume to wrap up all the available exchange surface.

6. A self-heating container according to claim 1, characterized in that the transverse cross-section of the outer insulating envelope as well as that of the vessel itself are reduced at the point corresponding to the membrane that separates the upper from the lower compartment of the vessel.

7. A self-heating container according to claim 1, characterized in that said metallic container has an upper edge or rim that is so shaped as to allow said peelable diaphragm to be thermally welded to the same and so as to make it possible to connect the same integrally to said vessel.

8. A self-heating container according to claim 1, characterized in that said breaking member is made up of a device arranged on the bottom of said lower compartment and it is provided with at least one arm turned upwards in the direction of said membrane, said arms being provided at their ends with projecting members.

9. A self-heating container according to claim 1, characterized in that said breaking member is made up of at least one little shaped tube.

10. A self-heating container according to claim 1, characterized in that said outer envelope is open at the bottom and in that said plastic material vessel is provided with a concave elastic bottom that can bend inwards, thanks to the realization of a toroidal projection having the function of a hinge.

11. A self-heating container according to claim 1, characterized in that said breaking member is made up of at least one stem or vertical member which is realized direct by extrusion on the concave bottom of the plastic material vessel.

12. A self-heating container according to claim 1, characterized in that an employment indicator is provided, which is made up of an irreversible, heat sensitive material.

13. A self-heating container according to claim 1, characterized in that the solid reactant is anhydrous calcium chloride of suitable grain size, while the liquid reactant is tap water.

14. A self-heating container according to claim 13, characterized in that acids and alkalies are added in equimolar amounts to said anhydrous calcium chloride.

15. A self-heating container according to claim 1, characterized in that said solid reactant is made up of calcium oxide, magnesium oxide, citric acid, oxalic acid, acetic acid, anhydrous magnesium or sodium sulfates.

16. A self-heating container according to claim 1, characterized in that the said reactants have granulometry 1-8.

17. A self-heating container according to claim 1, characterized in that said heat exchange occurs in 40 seconds.

18. A self-heating container according to claim 1, characterized in that a shaped, peelable container is provided above said metallic container, said peelable container containing solids and/or liquids to be added to the material contained within said metallic container before the heating operation.

19. A self-heating container according to claim 1 characterized in that a substance is additionally provided within said upper compartment of the vessel, which substance undergoes a state transition in a temperature range between 50° and 100° C.

20. A self-heating container according to claim 19, characterized in that said substance is non toxic and of low heat capacity as well as of a specific weight lower than that of water, said substance being also immiscible with water itself.

21. A self-heating container according to claim 19 characterized in that said substance is benzoic acid, glutaric acid, 90% stilbene or a mixture of paraffins.

* * * * *